Figure 1:
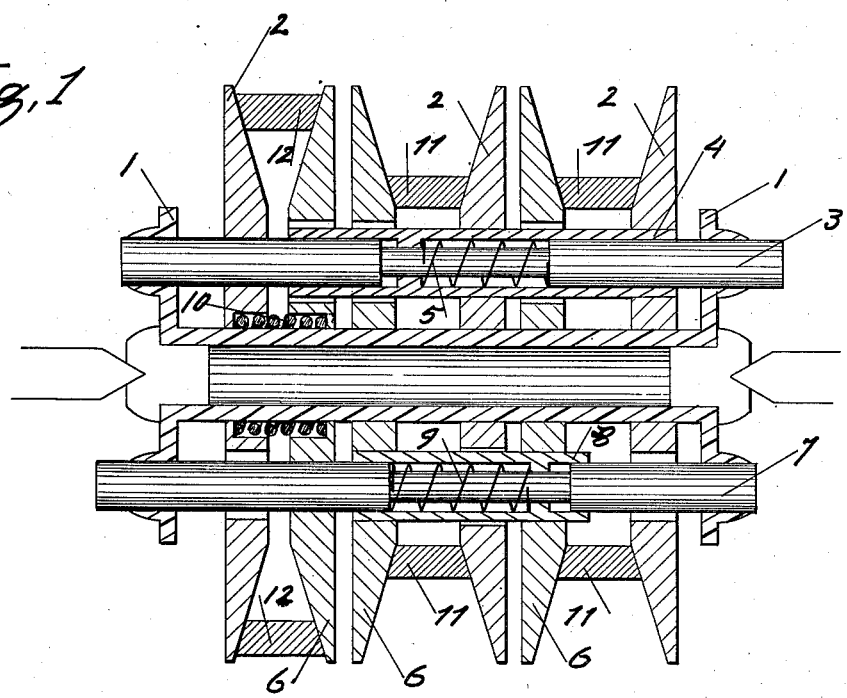

Oct. 27, 1936.  J. H. HOLLESTELLE  2,058,981
VARIABLE SPEED TRANSMISSION
Filed July 1, 1932   3 Sheets-Sheet 1

Witnesses:
John P. de Groot
Paul C. Schmidt

Inventor:
Jan Hendrik Hollestelle

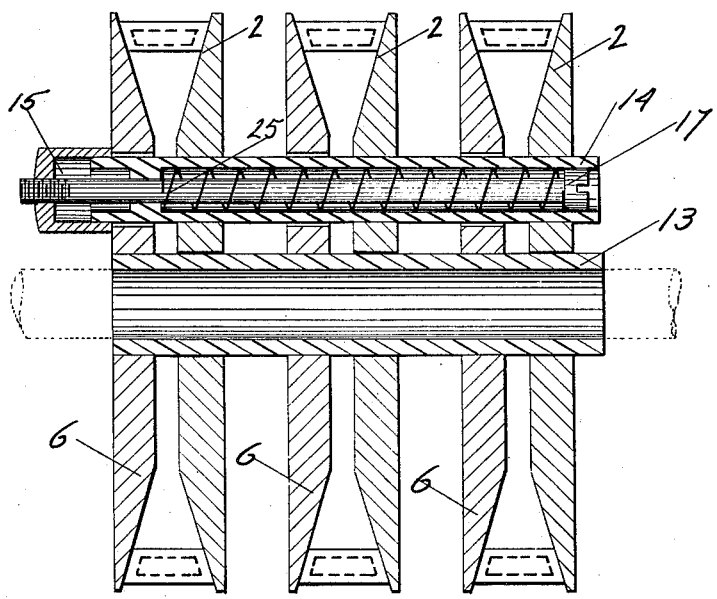
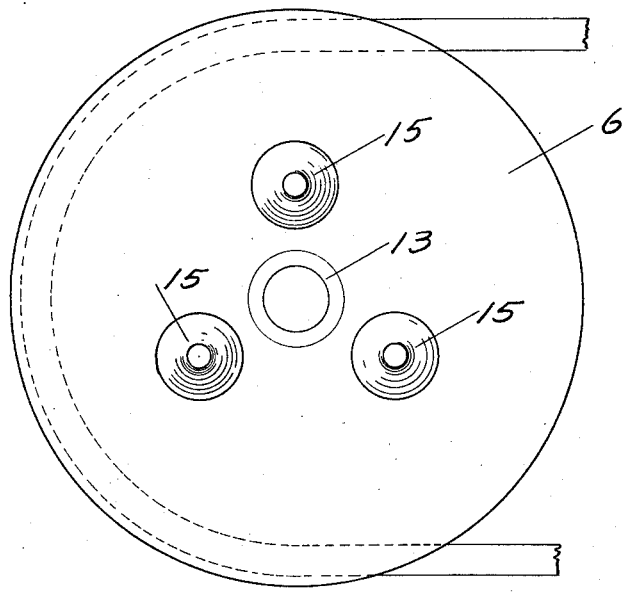

Patented Oct. 27, 1936

2,058,981

UNITED STATES PATENT OFFICE 2,058,981

VARIABLE-SPEED TRANSMISSION

Jan Hendrik Hollestelle, Evanston, Ill., assignor to Howard Willis L'Hommedieu, Chicago, Ill.

Application July 1, 1932, Serial No. 620,439

25 Claims. (Cl. 74—230.17)

This invention relates in general to power transmission, and has more particular reference to a mechanism for transmitting variable speeds by means of single or multiple belts. For this transmission cone pulleys are used.

One of the principal objects of the invention is to provide a pulley which is adaptable to a wide range of conditions without fundamental change in construction, and also to greatly simplify the form of construction used, as pulleys of this type so far developed have been greatly restricted in their usefulness.

Some of the difficulties encountered have been the maintenance of required belt tension and alignment during radial changes of belt engagement. One of the reasons for this is that the lengths of belt travel vary as the belts engage varying arcs of contact. The use of curved pulley faces, spanners and chain belts have solved these problems to some extent. All of these devices, however, have disadvantages, and limit the use of the pulleys. None of them distribute equally over all the belts, the different pressures which occur when the same power is transmitted at different speeds.

In a transmission receiving power at one speed and transmitting that power at another speed, the belt travelling at the lower speed must exert a proportionately greater force. With receiving and transmitting pulleys on the same mounting, and reacting directly against each other, each set of belts is subjected to the same compressive force. Where the speed reduction is large it may be necessary to use more belts at the lower speed to carry the greater pull and compressive force. This would relieve the undue pressure on that set of belts, but their combined force would still react against the other set of belts, which would have no need of being strengthened except to withstand that excessive compression.

I have therefore designed a pulley with self-adjusting reactions to lateral displacement, so that the pressure will be evenly distributed over all the pulleys on the same mounting. When the ratio of speed change remains constant, it is possible to use the exact number of belts required, operating at a tension normal for each belt. It is necessary to increase the tension only to provide for the greater force resulting from change of speed during operation.

In most transmissions of this type it has been found necessary to use specially constructed belts, laterally rigid, to withstand the unusual pressures to which they are subjected. The distribution of pressures in my pulley enables me to use flexible belts, as I have developed a practicable means of changing speed by using these belts in multiple arrangement. This makes it unnecessary to use rigidly constructed belts to transmit large power. By combining this invention with the one described in my patent application No. 522,591, I am able to use standard belts.

In this latest invention I use rods, hollow bars and springs to connect the pulley sections, causing them to act in unison, whether on a driving or driven shaft, or as an intermediate transmission comprising driving and driven pulleys in one. The simultaneous and equal reactions on all pulley sections adds to this uniformity which characterizes the invention.

The active resistance against the pulley sections compensates for the differences in lengths of belt travel during changes in speed variation. This compensation is present at all times, and at all positions of belt engagement, something which is not possible where there is positive relationship between the pulley sections.

The resistances against lateral displacement can be so balanced in my construction that the belts are kept in alignment without lateral displacement. This makes it unnecessary to run the belts over a wide flat pulley at one end of the drive, or make other adjustments to compensate for the lateral displacement of the belt.

In my invention power can be transmitted in any direction perpendicular to the axis of rotation of the pulley, and to any reasonable distance. Used as an intermediate transmission, no restriction need be placed upon the relative distances to engaging pulleys, nor upon the angles at which these units operate. It is possible to use a wide variation in the diameters of the pulleys.

By extending the aforementioned rods and bars connecting the pulley sections, to points beyond the lateral travel of these sections, where they rest in bearings in disks, I obtain several advantages. The extended bearings facilitate sliding of the pulley sections; the disks can be used to provide common points of lateral reaction to sets of pulley sections; if it is desirable not to use a shaft as a support for the pulleys, the two outer disks alone afford bearing places, and the rods and bars resting in these bearings will support the pulley sections. The advantage of extended bearings to facilitate sliding can be obtained, in some instances, without the use of disks or other outer supports. The pulley sections alone may provide sufficient length of bearing support for this purpose.

The entire combination thus forms a complete unit which can be adapted to operate either as a free body in two opposing sets of belt loops, or mounted on a shaft or other bearings.

These and other objects of my invention will be better understood by referring to the drawings.

Figure 2:
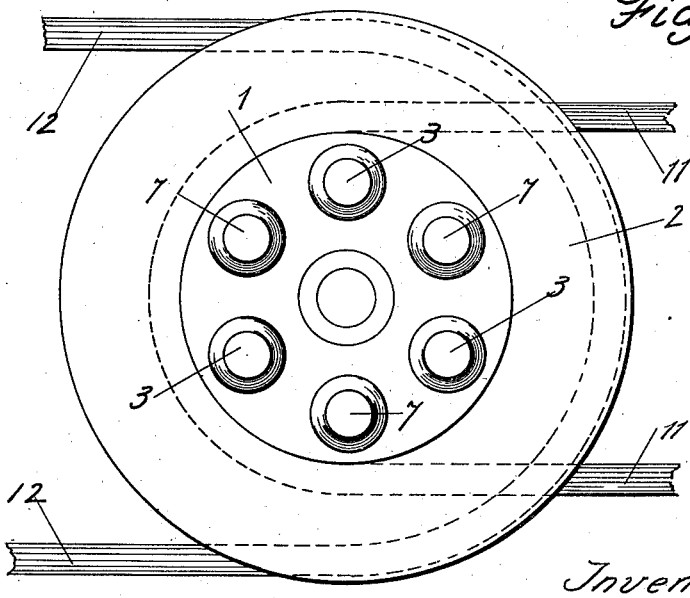

Sheet I, Figure 1 is a cross-section of a combination driving and driven element, and Figure 2 the end view thereof, both showing relative positions of the belts.

Sheet II, Figure 3, is a cross-section of a modified construction of the pulley, and Figure 4 an end view thereof.

Figure 5:
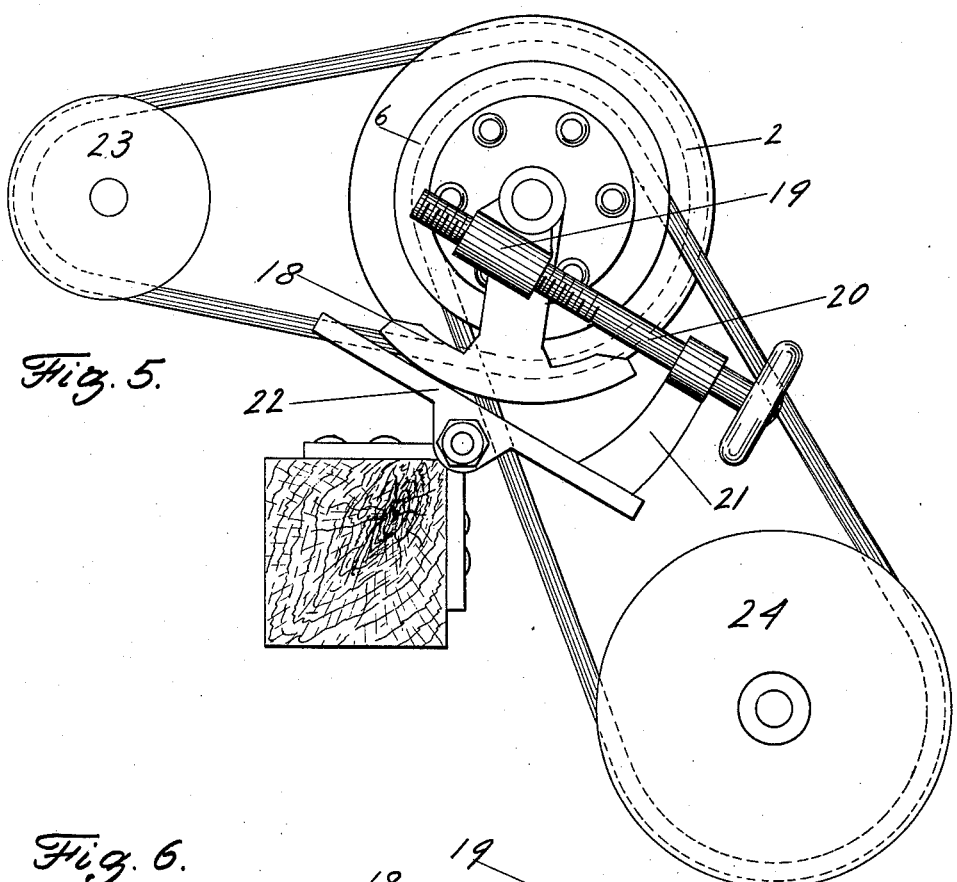
Figure 6:
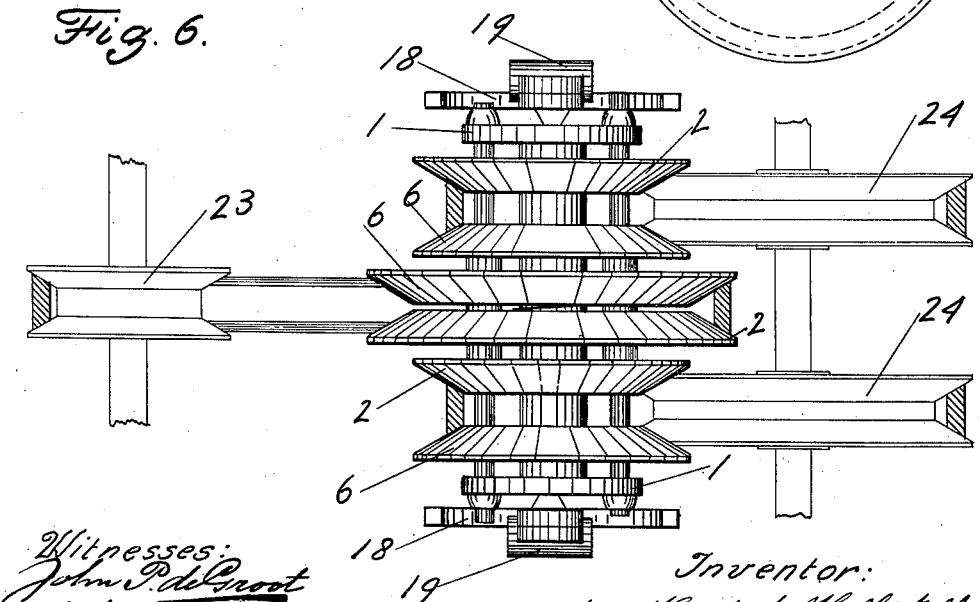

Sheet III, Figure 5 represents a side view of the pulley, belted to a driving and driven pulley, and Figure 6 a plan view thereof.

Considering Figures 1 and 2 in detail, 1—1 are end-disks of the assemblage, 2—2—2 are cone pulley sections, of which the two on the right are fixed on sleeves 4, which have interior shoulders. The sleeves are made slidable on bars 3.

The section 2 on the left is fixed on bars 3 which are slidable in bearings in the end-disks 1—1, and through openings in the sections 6—6—6. Springs 5, one on each bar 3, hold the section 2 on the left, and the sections 2—2 on the right, in tensional relation to one another.

The sections 6—6 on the right, and the section 6 on the left, are similarly held in tension by the springs 9. The bars 7, and the sleeves 8 on each bar are similarly connected with those elements slidable through the disks 1—1 and the sections 2—2—2. A spring 10 separates sections 2 and 6 which are engaged by the belt 12.

The whole operates as follows: one set of belts 11—11 pulls in a direction opposite to that of belt 12. Either set can be used as driving or driven belts.

The belts 11—11 press to the right against 2—2, and to the left against 6—6. These pressures are transmitted to the springs 5 and 9 respectively, and balanced by the spring 10 and the pressure of belt 12 on sections 2 and 6. Whereas with rigid connections between the two sets of pulley sections, and no compensating pressure, the belt 12 would have to bear the combined pressures of belts 11—11, in my arrangement the springs 5 and 9 on each set of bars, properly counteracted by the spring 10, enables me to make the pressure on each belt equal, or proportionate to its duties.

To more clearly demonstrate the value of this arrangement, assume the belt 12 to engage the pulley at a diameter larger than that at which the belts 11—11 engage their pulleys. In this position assume equal tension on the belts and equal compression due to the adjustment of the springs. When the positions of the belts are reversed, the spring 10 is released by the spreading of sections 2 and 6 on the left, so that, in this position, the lesser reactions of belts 11—11 at the larger diameter is compensated for by the loss of reaction of the spring 10. Were the pulley sections arranged in two sets as described, but in positive relationship to each other, either the belt 12 would be unduly compressed, or the belts 11—11 would not be compressed enough to give the required tension for driving. One or the other condition prevails in pulleys of this type so far developed.

Although I consider the construction described as a desirable one, I do not restrict myself to this particular application of the springs, but reserve the right to use dynamic reactions in any form that will produce the same results.

Figure 3 on Sheet II is a modified construction of my pulley. It is used where all belts simultaneously increase or decrease in diameter of engagement with the pulley faces.

I have mounted the sections 6—6—6 on a central hollow bar 13, with the sections 2—2—2 slidable over said bar and fixed on hollow bars 14, which are slidable through 6—6—6. In each bar 14 is a spring 25 which, with the aid of a cap or fitting 15, and adjustable rod 17, holds the two sets of pulley sections in adjustable tension against the belts. The assemblage may be keyed on a shaft, or used as an intermediate transmission with essentially the same characteristics as the arrangement first described.

Figures 5 and 6 on Sheet III demonstrate the use of my pulley as an intermediate transmission. Here the control of the pulleys is similar to that shown in Figures 1 and 2. The pulley sections 2—2—2 and 6—6—6 are mounted as a unit on a rolling support 18, and adjustable by means of a swivel nut 19 and screw 20, held in support 21 against displacement. It forms, with the adjustable support 22, a combination of movable and retaining qualities as is usually desired for such mechanisms.

The intermediate pulley is belted to other pulleys 23 and 24, its various positions between 23 and 24 affording a variation in the speeds of the two pulleys. I have here demonstrated merely one possible arrangement by which the pulley is put to practical use.

My invention is not limited in the number of pulleys, the number of belts on each pulley, the spacing between the pulley sections, the relative diameters of the pulleys on the same mounting or in belted connection with each other, nor in the form of self-adjusting reaction used.

It is apparent from the foregoing that the pulley is adaptable to a wide variety of uses and operating conditions. I therefore do not limit the invention or its applications to the constructions and arrangements shown, but reserve all modifications which attain the same object by use of the same general principles as here employed.

I claim:

1. A variable speed transmission mechanism comprising a support, a plurality of pulley sections forming a series of pulleys mounted on said support, corresponding sections of some of said pulleys secured together, means yieldingly connecting said corresponding sections to an opposed section of another of said pulleys, and yielding means connecting the remaining corresponding sections to the remaining section of said other pulley.

2. A variable speed transmission mechanism comprising a support, a plurality of pulley sections forming a series of pulleys, all of said pulley sections movable axially with respect to said support, means yieldingly connecting corresponding sections to an opposed section of another of said pulleys, and yielding means connecting the remaining corresponding connected sections to the remaining section of said other pulley.

3. A variable speed transmission mechanism comprising a plurality of pulleys in the form of opposed pulley sections, a support for said pulley sections, all of said sections being laterally movable with respect to said support, means securing a corresponding pair of pulley sections together, means resiliently connecting an opposed section of another of said pulleys to said last named sections, and means resiliently connecting the remaining sections of said pair of pulleys to the cooperating section of said other pulley.

4. A variable speed transmission mechanism comprising a support, a plurality of laterally floating pulleys mounted on said support, said pulleys having opposed pulley sections, means securing corresponding sections of some of said pulleys together, means yieldingly connecting said last named sections to an opposed section of another of said pulleys, and separate members connecting the remaining sections together.

5. A variable speed transmission mechanism comprising a support, a plurality of laterally floating pulleys mounted on said support, said pulleys having opposed pulley sections, means securing corresponding sections of some of said pulleys together, means yieldingly connecting said last named sections to an opposed section of another of said pulleys, and means yieldingly connecting the remaining sections together.

6. A variable speed transmission mechanism comprising a plurality of pulleys having opposed pulley sections mounted on a common shaft, all of said sections being laterally movable in an axial direction on said shaft, means for securing corresponding sections of certain pulleys together and means for resiliently connecting said last named sections with the opposed section of a certain other of said pulley.

7. A variable speed transmission mechanism comprising a support, a plurality of pulleys having opposed pulley sections mounted on said support, and means comprising separate resilient members connecting corresponding facing sections of one set of pulleys with the opposite facing section of another of said pulleys for holding the cooperating sections of each of said pulleys in tensional relationship with respect to each other.

8. A variable speed transmission mechanism comprising a plurality of pulleys having opposed pulley sections, means comprising separate resilient members connecting corresponding facing sections of one set of pulleys with the opposite facing section of another of said pulleys for holding cooperating sections of all pulleys in tensional relationship with respect to each other, and means for supporting all of said pulleys whereby all of said sections may move laterally for maintaining the alignment of the belts.

9. A variable speed transmission mechanism comprising a shaft, a plurality of pulleys mounted on said shaft, said pulleys having a plurality of opposed pulley sections, all of said sections being axially movable on said shaft, transversely extending separate members rigidly connecting corresponding sections of certain of said pulleys together and resilient connections for connecting said last named sections to the opposite section of a certain other of said pulleys, whereby certain of the belts of certain of said pulleys simultaneously change to travel in the same diameters.

10. A variable speed transmission mechanism comprising a shaft, a plurality of pulleys mounted on said shaft, said pulleys having a plurality of opposed pulley sections, all of said sections being free to move laterally on said shaft, means for rigidly securing corresponding sections of certain of said pulleys together and means operatively related to said first named means for connecting said last named sections to the opposite section of a certain other of said pulleys.

11. A variable speed transmission mechanism comprising a shaft, a plurality of pulleys mounted on said shaft in the form of opposed pulley sections, all of said sections being movable with respect to said shaft, means extending through said sections and independent of said shaft for securing corresponding sections of certain of said pulleys together, and means extending through said sections independent of said shaft for resiliently connecting said last named sections to the opposite section of a certain other of said pulleys.

12. A variable speed transmission mechanism comprising a shaft, oppositely disposed plates carried by said shaft, a plurality of pulleys slidably mounted on said shaft, said pulleys in the form of separate opposed pulley sections, tubular members extending through and secured to corresponding sections of certain of said pulleys, sliding members extending through said tubular members, means yieldingly connecting said sliding members to said tubular members and an opposite section of a certain other of said pulleys, whereby when certain of said sections contract certain other of said sections expend.

13. The combination of a variable speed drive mechanism comprising a driven means and a driving means, said driving means including a shaft, a plurality of oppositely disposed pulley sections mounted on said shaft, all of said pulley sections movable axially with respect to said shaft, certain of said corresponding sections secured together, and a plurality of belts trained about said driving and driven means whereby upon adjustment of said shaft in a lateral direction the speed of said driven means is varied.

14. The combination of a variable speed drive mechanism comprising a driven means and a driving means including a shaft, a plurality of oppositely disposed pulley sections mounted on said shaft, certain of said corresponding sections secured together, said last named sections resiliently connected to an opposed section of another pulley, certain other sections connected together and resiliently connected to the other section of said last named pulley, and a plurality of belts trained about said driving and driven means whereby upon adjustment of said shaft in a radial direction the speed of said driven means is varied.

15. The combination of a variable speed drive mechanism comprising a driven means and a driving means, said driving means including a shaft, opposite pulley sections mounted on said shaft and all of said sections being movable axially with respect to said shaft, a belt trained about said driving, and driven means and means for adjusting lateral position of said shaft relative to said driven means for varying the speed of said driven means.

16. A variable speed transmission mechanism comprising a support, pulleys comprising opposed pulley sections mounted on and axially movable with respect to said support, said sections having tapered belt engaging faces, means connecting corresponding sections of some of said pulleys to an opposing section of another of said pulleys, means connecting the remaining corresponding sections to the remaining section of said other pulley, including resiliently movable transverse means spaced from the axis of said pulleys and laterally movable independently of said support connecting said sections together.

17. A variable speed transmission mechanism comprising a support, pulleys comprising opposed pulley sections mounted on and floatingly movable axially with respect to said support, said sections having tapered belt engaging faces, means connecting corresponding sections of some of said pulleys to an opposing section of another of said pulleys, means connecting the remaining corresponding sections of said pulleys to the remaining section of said other pulley, including resiliently actuated transverse means movable axially with respect to said support for yieldingly connecting said sections together.

18. A variable speed transmission mechanism comprising a support, pulleys comprising a plurality of opposed pulley sections mounted on and movable axially with respect to said support, said sections having tapered belt engaging faces, and resilient means axially movable with respect to said support yieldingly connecting corresponding sections of some of said pulleys to an opposed section of another of said pulleys.

19. A variable speed transmission mechanism comprising a support, pulleys mounted on said support, said pulleys comprising opposing pulley sections axially movable with respect to said support and having tapered belt engaging faces, means securing corresponding sections of some of said pulleys to an opposing section of another of said pulleys, means connecting the remaining corresponding sections to the remaining section of said other pulley, and transverse members spaced from the axis of said pulleys and laterally movable independently of said support for connecting said sections together.

20. A variable speed transmission mechanism comprising a support, pulleys mounted on said support, said pulleys comprising a plurality of opposed pulley sections movable axially with respect to said support and having tapered belt engaging faces, and means axially movable with respect to said support connecting corresponding sections of certain of said pulleys to an opposed section of another of said pulley.

21. A variable speed transmission mechanism comprising a shaft, a plurality of pulleys mounted on said shaft, said pulleys including a plurality of opposed pulley sections, all of said pulleys being free to move axially on said shaft, means securing corresponding sections of some of said pulleys together and to an opposite section of another of said pulleys.

22. A variable speed transmission mechanism comprising a support, a plurality of pulleys mounted on said support comprising opposed pulley sections, all of said sections being floatingly movable axially with respect to said support and means for connecting the corresponding sections of all of said pulleys together.

23. A variable speed transmission mechanism comprising a support, a plurality of pulleys mounted on said support comprising opposed pulley sections, all of said sections being floatingly movable axially with respect to said support, and means for resiliently connecting one set of corresponding pulley sections to the other set of corresponding pulley sections.

24. A variable speed transmission mechanism comprising a support, pulleys comprising a plurality of opposed pulley sections mounted on said support and having tapered belt engaging faces, means connecting corresponding sections of certain of said pulleys to an opposed section of another of said pulleys.

25. A variable speed transmission mechanism comprising a support, pulleys comprising a plurality of opposed pulley sections mounted on said support and having tapered belt engaging faces, means connecting corresponding sections of some adjacent pulleys to an opposed section of another of said pulleys.

JAN HENDRIK HOLLESTELLE.